(12) United States Patent  
Rowles

(10) Patent No.: US 6,354,424 B1
(45) Date of Patent: Mar. 12, 2002

(54) BRAKE ROLLER FOR USE IN ROLLER TRAY ASSEMBLY FOR LOADING AND UNLOADING CARGO

(75) Inventor: John F. Rowles, Fullerton, CA (US)

(73) Assignee: Ancra International, LLC., Hawthorne, CA (US)

( * ) Notice: Subject to any disclaimer, the term of this patent is extended or adjusted under 35 U.S.C. 154(b) by 0 days.

(21) Appl. No.: 09/585,052

(22) Filed: Jun. 1, 2000

(51) Int. Cl.$^7$ ............................................... B65G 13/00
(52) U.S. Cl. ...................................................... 193/35 A
(58) Field of Search ....................................... 193/35 A

(56) References Cited

U.S. PATENT DOCUMENTS

| | | | | |
|---|---|---|---|---|
| 3,511,350 A | * | 5/1970 | Vom Stein | 193/35 A |
| 3,576,242 A | * | 4/1971 | Mumma | 193/35 A |
| 3,648,815 A | * | 3/1972 | Wochner | 193/35 A |
| 3,789,960 A | * | 2/1974 | Warren | 193/35 A X |
| 3,918,561 A | * | 11/1975 | Isacsson | 193/35 A |
| 4,000,796 A | * | 1/1977 | Bolton et al. | 193/35 A |
| 4,089,399 A | | 5/1978 | Webb | |
| 4,205,710 A | * | 6/1980 | Hammond | 193/35 A |
| 4,462,493 A | | 7/1984 | Nordstrom | |
| 4,541,518 A | * | 9/1985 | Palazzolo et al. | 193/35 A |
| 4,600,093 A | * | 7/1986 | Adams | 193/35 A |
| 4,723,646 A | * | 2/1988 | Scheneman, Jr. | 193/35 A |
| 4,823,927 A | | 4/1989 | Jensen | |
| 5,147,020 A | * | 9/1992 | Scherman et al. | 193/35 A |
| 5,884,744 A | * | 3/1999 | Stodkowski | 193/35 A |
| 6,131,717 A | * | 10/2000 | Owen | 193/35 A |

* cited by examiner

Primary Examiner—Stephen T. Gordon
Assistant Examiner—Lori L Coletta
(74) Attorney, Agent, or Firm—Edward A. Sokolski

(57) ABSTRACT

A roller tray assembly has a plurality of roller wheels mounted on the floor of a loading platform of a vehicle such as an aircraft or truck. The roller wheels are free to roll either in the loading or unloading directions to permit cargo to be loaded or unloaded on such wheels. Braking rollers are installed on the loading platform floor, the cargo load being moved over such braking rollers. Each braking roller has a central hub supported on unidirectional clutch bearings such that the roller is free to rotate in one direction but locked by the bearings against rotation in the opposite direction. The outer wall of the central hub is covered with an elastomer. The roller has an outer cylindrical wall against which the cargo abuts. The ends of the cylindrical wall have end covers between which a plurality of rods are mounted. These rods abut against the elastomer with sufficient pressure to deform the elastomer. The central hub is rotatably mounted on a fixed shaft. The assembly is free to rotate in one direction. In the opposite direction, the clutch bearings prevent the central hub from rotating. The hub outer wall, however, carries the rods around against the elastomer which is deformed by the rods. This permits motion against resistive force opposing such motion.

5 Claims, 2 Drawing Sheets

BRAKE ROLLER FOR USE IN ROLLER TRAY ASSEMBLY FOR LOADING AND UNLOADING CARGO

BACKGROUND OF THE INVENTION

1. Field of the Invention.

This invention relates to roller braking devices and more particularly to such a device for use in a roller assembly for loading and unloading cargo in a vehicle.

2. Description of the Related Art

Roller devices for use in loading and unloading cargo on the floor of a vehicle such as an aircraft or a truck are well known in the art. The rollers are often mounted on a track attached to the vehicle floor such as shown in U.S. Pat. No. 4,462,493 issued to Nordstrom on Jul. 31, 1984. When such rollers are employed it is necessary to provide a mechanism for retaining the cargo in the loaded position. This end result can be achieved by lowering the wheels below the floor as described in U.S. Pat. No. 4,823,927 issued Apr. 25, 1989 to Jensen.

While unloading or loading cargo, some braking action is generally needed to restrain the cargo against free motion along the floor when the rollers are in their raised position. This is particularly necessary where the vehicle floor is on a slant, as in the case of most aircraft. U.S. Pat. No. 4.,089,389 issued May 16, 1978 to Webb describes the use of stop plates for achieving this end result. Other approaches include the use of a viscous fluid within a braking roller and the use of sliding friction surfaces in the roller. The use of viscous fluid has the disadvantage of the danger of leakage while approaches using sliding friction and stop plates have the shortcoming of the wear and tear on this elements which requires replacement more frequently than to be desired.

SUMMARY OF THE INVENTION

The system of the present invention utilizes braking rollers which are mounted on the vehicle floor, to provide resistance to the movement of the cargo in one direction and permitting free movement in the opposite direction. A plurality of such braking rollers may be used, some oriented to provide resistance to motion in one direction, others oriented to provide resistance to motion in the opposite direction (or any other direction as may be needed). Each braking roller has a central hub which is supported on unidirectional bearings such that the central hub of the roller is free to rotate in one direction but locked against rotation in the opposite direction. The central hub is mounted for rotation on a fixed shaft.

The outer wall of the central hub is covered with an elastomer. The roller has an outer cylindrical wall on which the cargo rides. The opposite ends of the cylindrical wall have end covers between which a plurality of rods are supported for rotation on the central shaft on bearings. These rods abut against the elastomer with sufficient pressure to deform the elastomer and provide braking action. The outer wall is thus coupled to the central hub and will rotate therewith when the central hub is free to rotate(i.e. in one direction). The roller is free to rotate in one direction. In the opposite direction, the unidirectional bearings prevent the central hub from rotating. The hub outer wall, however, carries the rods around along the elastomer which is deformed by the shafts and thus while rotation is permitted there is resistance against such rotation.

It is therefore an object of this invention to provide an improved brake roller for providing resistance against the motion of cargo along roller wheels during the loading and unloading of cargo.

It is a further object of this invention to provide a brake roller for use in loading and unloading cargo along roller wheels which is of more economical construction than prior art devices.

It is still a further object of this invention to provide a brake roller for use in loading and unloading cargo along roller wheels which is more durable than prior art devices.

Other objects of the invention will become apparent in view of the following description taken in connection with the accompanying drawings.

DETAILED DESCRIPTION OF THE INVENTION

Figure 1:
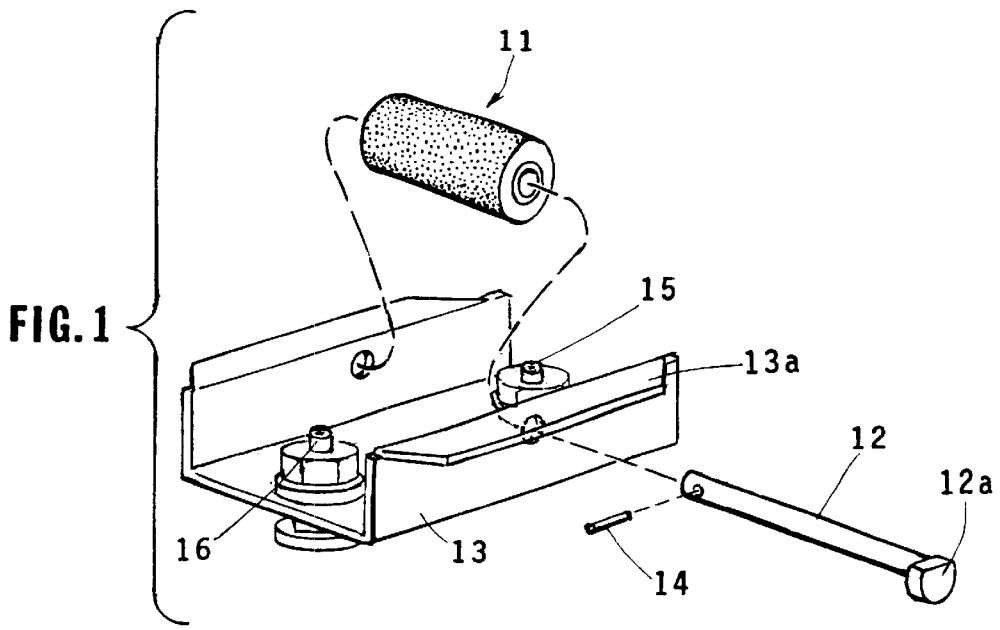
FIG. 1 is a left top exploded perspective view showing the installation of a preferred embodiment of the device of the invention in a support frame.

Referring now to the FIGS, a preferred embodiment of the invention is illustrated. As shown in FIG. 1, roller 11 is mounted for rotation on fixed shaft 12 which is fixedly supported on tray 13. Shaft 12 is retained to the tray by means of spring pin 14 and prevented from rotating by flattened head 12a which abuts against leaf 13a of the tray. A pair of connector studs 15 and 16 are fixedly attached to the base of the tray. These studs are adapted to fit onto a track such as described in aforementioned U.S. Pat. No. 4,462,493 to removably retain the tray thereon.

Figure 2:
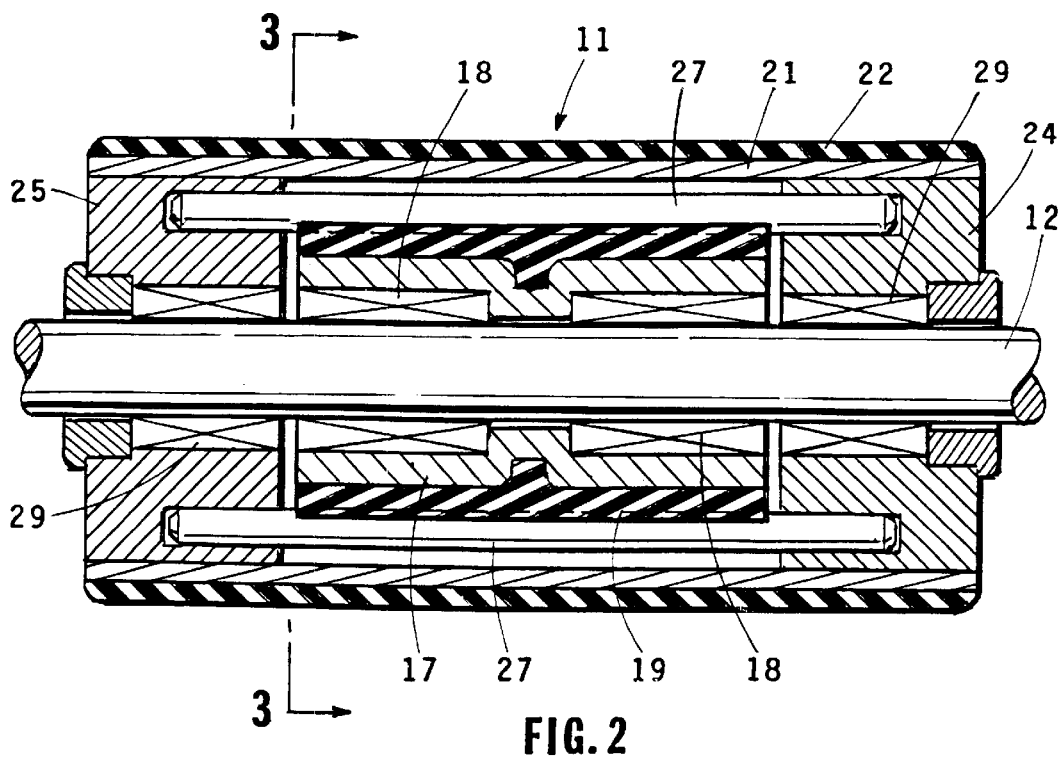
FIG. 2 is a cross sectional view of the preferred embodiment.
Figure 3:
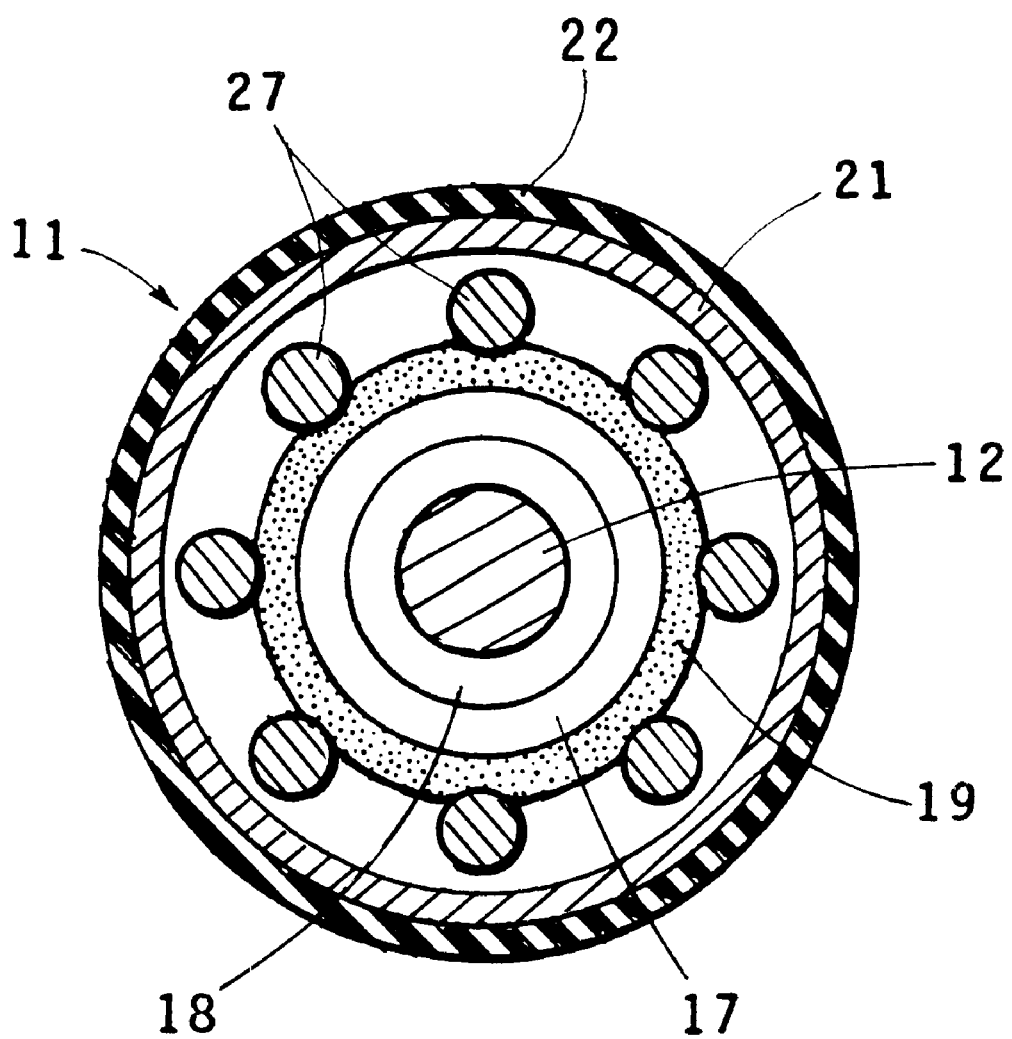
FIG. 3 is a cross sectional view taken along the plane indicated by 3—3 in FIG. 2.

Referring now to FIGS. 2 and 3, the structure of the roller 11 is illustrated. Central hub 17 is supported on shaft 12 by means of clutch needle bearings 18 which permit free rotation of the central hub in one direction but brake rotation in the opposite direction. Such bearings are commercially available from Torrington Company, 59 Field Street, Torrington, Conn., 06790 as part no. FC-6.

The outer wall of central hub 17 is covered with a durable elastomer 19 which is deformable and vulcanized to the hub. This elastomer may be fluoroelastomer 70–75, shore A sold under the brand name Viton. Outer cylindrical wall is supported through its end covers walls 24 and 25 on shaft 12 by means of bi-directional bearings 29. Outer cylindrical wall 21 has a hard rubber surface 22 which is bonded to the wall on which the cargo rides. This surface may be formed from polyurea polyurethane, 85, shore A. End covers 24 and 25 have rods 27 attached thereto at their opposite ends. Rods 27 abut against elastomer 19 which sufficient pressure to deform the elastomer.

In operation, roller 11 is free to rotate on one direction. In the opposite direction, the braking action of the bearings 18 resists rotation. Rotation of the outer wall 21 with motion of the cargo over the roller will occur, however, by virtue of the movement of shafts 27 about elastomer 19. The shafts press against the elastomer with enough pressure to deform the elastomer, thereby effecting braking action but not with enough pressure to prevent rotation. During braking, the shafts 27 rotate by virtue of their attachment to walls 24 and 25 and roll along the surface of elastomer 19.

Thus, the roller of the device of the invention is free to rotate in one direction but provides resistance against rotation in the opposite direction. This end result is achieved with a roller which is simple and economical in construction and which is capable of longer life and more reliable operation as compared with prior braking rollers which employ sliding friction or hydraulic mechanisms. It is to be noted that if so required, a plurality of rollers can be utilized to provide braking action in opposite directions by orienting some of the rollers to provide braking in one direction and orienting others to provide braking in the opposite direction.

While the invention has been described and illustrated in detail, this is intended by way of illustration and example only, the scope of the invention being limited by the terms of the following claims.

I claim:

1. A braking roller comprising:
   a fixed shaft,
   a central hub having an elastomer covering its outer wall,
   unidirectional bearing means for supporting said central hub on said shaft for free rotational motion in one direction and locked against rotation in the direction opposite to said one direction,
   an outer wall having end covers,
   bearing means for rotatably supporting said outer wall on said shaft, and
   means connected between said end covers and abutting tightly against the elastomer covering the outer wall of the central hub to provide friction between the outer wall and the central hub,
   the roller thereby free to rotate in said one direction with braking resistance against rotation being provided by virtue of the abutment of the rods against the elastomer.

2. The braking roller of claim 1 wherein said means connected between said end covers comprises a plurality of rods.

3. The braking roller of claim 1 wherein the central hub and the outer wall are in the form of concentric cylinders.

4. A braking roller for braking the motion of cargo passing thereover on the floor of a vehicle in one direction but permitting free movement in the direction opposite to said one direction comprising:
   a shaft,
   a tray non-rotatably supporting said shaft,
   a cylindrical central hub,
   bearing means for supporting said central hub on said shaft braked against rotatable motion in said one direction and for free rotation in the direction opposite to said one direction,
   a resilient elastomer covering the outer wall of said central hub,
   an outer cylindrical wall surrounding said central hub, said outer cylindrical wall having end covers,
   bearing means for rotatably supporting said outer wall on said shaft, and
   a plurality of rods connected between the end covers of the outer wall, said rods tightly abutting against the elastomer to effect braking action between said central hub and said outer wall,
   whereby the outer wall is braked against rotation in said one direction sufficiently to provide resistance to rotation but not so as to prevent rotation and is permitted to rotate freely along with the central hub in the direction opposite to said one direction.

5. The roller of claim 4 wherein the outer surface of the outer wall has a rubberized coating thereon.

* * * * *